(12) United States Patent
Shirai et al.

(10) Patent No.: US 6,286,383 B1
(45) Date of Patent: Sep. 11, 2001

(54) BALL SCREW DEVICE

(75) Inventors: Takeki Shirai; Hidekazu Michioka; Shigeru Ebina; Ryuji Takeda, all of Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/423,609

(22) PCT Filed: Mar. 5, 1999

(86) PCT No.: PCT/JP99/01094

§ 371 Date: Nov. 15, 1999

§ 102(e) Date: Nov. 15, 1999

(87) PCT Pub. No.: WO99/49240

PCT Pub. Date: Sep. 30, 1999

(30) Foreign Application Priority Data

Mar. 25, 1998 (JP) .................................................. 10-077787

(51) Int. Cl.$^7$ .................................. F16H 1/14; F16H 1/20
(52) U.S. Cl. ..................... 74/424.88; 74/424.86; 74/424.87
(58) Field of Search ........................... 74/89.15, 424.8 R, 74/459; 384/45, 49, 51

(56) References Cited

U.S. PATENT DOCUMENTS

| | | | |
|---|---|---|---|
| 2,767,593 | * 10/1956 | Hogan | 74/459 |
| 6,070,479 | * 6/2000 | Shirai | 74/89.15 |
| 6,095,009 | * 8/2000 | Takagi | 74/459 |
| 6,149,307 | * 11/2000 | Kamimura et al. | 384/49 |
| 6,176,149 | * 1/2001 | Misu | 74/459 |

FOREIGN PATENT DOCUMENTS

| | | |
|---|---|---|
| 57-101158 | 6/1982 | (JP) . |
| 5-27408 | 4/1993 | (JP) . |
| 10-89360 | 4/1998 | (JP) . |

* cited by examiner

*Primary Examiner*—David Fenstermacher
(74) *Attorney, Agent, or Firm*—Arent Fox Kintner Plotkin & Kahn

(57) ABSTRACT

This invention relates to improvement of a ball screw unit in which a nut member meshes with a screw shaft via a plurality of balls circulating endlessly. The balls are disposed freely rotatably in line at a predetermined interval in a ball arranging member formed in a belt-like shape. If a relative rotation occurs between the nut member and screw shaft, the balls circulate in the infinite circulation path with the ball arranging member. Guide pieces are projected to both sides of the ball arranging member and guide grooves for accommodating each of the guide pieces are formed along the entire circumference of the infinite circulation path. Therefore, the ball arranging member is introduced by the guide grooves and circulates in the infinite circulation path without being fluttered.

10 Claims, 10 Drawing Sheets

BALL SCREW DEVICE

FIELD OF THE INVENTION

The present invention relates to a ball screw unit in which a screw shaft meshes with a nut member via a plurality of balls so as to convert a rotating motion of a motor to a linear motion in a slide portion of a machine tool or an industrial robot and transmit that linear motion thereto, and more particularly to improvement of the ball screw unit in which a ball arranging member for arranging a plurality of balls at a predetermined interval is incorporated in a ball infinite circulation path of the nut member.

DESCRIPTION OF THE RELATED ART

The ball screw unit is used in a number of linear slide portions and the like of an industrial robot, mainly to give a linear traveling amount corresponding to a rotation amount of the motor to a movable body such as a table or the like. Generally, the ball screw unit comprises a screw shaft in which a spiral ball rolling groove is formed on an outer peripheral face thereof and a nut member which meshes with the screw shaft via a plurality of balls, and contains an infinite circulation path in which the balls circulate. When the screw shaft connected to a motor is rotated, a plurality of the balls interposed between the screw shaft and nut member circulate in the infinite circulation path provided in the nut member, so that the nut member moves linearly gently in an axial direction of the screw shaft correspondingly.

On the other hand, in such a conventional ball screw unit, individual balls circulating in the ball infinite circulation path make contact with balls located back and forth, so that smooth circulation of the balls is hampered and further, a contact sound produced between adjacent balls when the screw shaft is rotated at a high speed grates on the ears. Japanese Utility Model Application Laid-Open No.HEI5-27408 has disclosed a ball screw unit for solving such problems.

In the ball screw unit disclosed therein, a belt-like ball arranging member having a flexibility is provided in the ball infinite circulation path so that it is capable of circulating. Such an arranging member has ball pockets each for accommodating the ball disposed at a predetermined interval. Therefore, the balls are accommodated in the ball infinite circulation path of the nut member such that they are arranged in the belt-like arranging member at the predetermined interval and consequently, in this ball screw unit, a contact between the balls circulating in the infinite circulation path is prevented.

Further, in the ball screw unit, the ball infinite path is formed by mounting a ball circulation pipe on the nut member and a pair of guide grooves for guiding both edge portions of the ball arranging member are formed in an inner peripheral face of the ball circulation pipe. Therefore, a fluttering of a belt-like retainer in the ball circulation pipe is prevented by such a guide groove thereby ensuring smooth circulation of the balls in the ball infinite path.

However, in the conventional ball screw unit, although circulation of the arranging member is guided by the guide grooves in the ball circulation pipe as described above, in a region in which the balls roll between the screw shaft and nut member, that is, in load region, only the arranging member is inserted in a slight gap formed between an outer peripheral face of the screw shaft and an inner peripheral face of the nut member. Thus, if the belt-like arranging member deflects even slightly with a circulation of the balls, the arranging member which moves relatively in an opposite direction makes a contact with the outer peripheral face of the screw shaft, so that the arranging member is worn early.

Further, a large resistance is applied to circulation of the arranging member and circulation of the balls, so that smooth motion of the nut member with respect to the screw shaft is hampered.

If the guide grooves for the belt-like arranging member are formed in only the ball circulation pipe, unless the arranging member is formed endlessly, an end portion of the arranging member is caught by an entrance of the ball circulation pipe when it invades therein from the load region, so that smooth circulation of the arranging member is also obstructed.

SUMMARY OF THE INVENTION

The present invention has been accomplished in views of such problems, and therefore, an object of the invention is to provide a ball screw unit which prevents an arranging member built in an infinite circulation path of a nut member from making contact with a screw shaft, and prevents such an arranging member from being caught in the infinite circulation path during circulation, thereby ensuring smoothness in ball circulation and a motion of the nut member with respect to the screw shaft and preventing wear in the arranging member.

To achieve the above object, the present invention provides a ball screw unit comprising a plurality of balls, a screw shaft in which a spiral ball rolling groove is formed on an outer peripheral face thereof, a nut member having a spiral load rolling groove opposing the ball rolling groove of the screw shaft, provided on an inner peripheral face thereof, the nut member meshing with the screw shaft via the balls, and a circulation path forming member for connecting both ends of the load rolling groove of the nut member so as to form an infinite circulation path for the balls, wherein a ball arranging member which arranges the balls at a predetermined interval and circulates in the infinite circulation path with the ball is provided in the infinite circulation path, a guide piece which is projected to both sides in an arrangement direction of the ball with respect to a diameter of the ball is formed in the ball arranging member, a pair of guide grooves for accommodating the guide piece of the ball arranging member is formed in an inner circumference of the circulation forming member in a ball rolling direction, and a pair of introducing grooves which accommodates the guide piece of the ball arranging member and are continuous with the guide groove are formed on both sides of the load rolling groove of the nut member.

According to such a technological means, guide pieces extending on both sides of the ball arranging member in the direction of the ball arrangement from a diameter of the ball are formed on the ball arranging member circulating in the infinite circulation path with the balls, and an introducing groove for accommodating the guide piece of the ball arranging member is formed on both sides of the load rolling groove of the nut member. Thus, when the balls roll between the load rolling groove of the nut member and ball rolling groove of the screw shaft, that is, the load region, the ball arranging member is guided by the introducing groove along an inner peripheral face of the nut member. Therefore, in such a load region, the ball arranging member which moves with rolling of the balls never flutters thereby making it possible to prevent a contact between the ball arranging member and screw shaft.

Because the introducing groove formed on both sides of the load rolling groove of the nut member is continuous with the guide groove formed in an inner circumference of the circulation path forming member, even if the ball arranging member is not formed endlessly, an end portion of the ball arranging member invading into the circulation path forming member from the load region is not caught at an entrance of the circulation path forming member and a plurality of the ball arranging members can be built in series in the infinite circulation path provided in the nut member.

Here, the aforementioned ball arranging member may be of any type as long as a plurality of balls can be arranged at a predetermined interval and for example, a belt-like retainer as disclosed in the above-mentioned Japanese Utility Model application Laid-Open No.HEI5-27408, in which ball accommodating holes having a slightly larger diameter than the ball diameter are formed in a flexible belt of synthetic resin at a predetermined interval. However, from viewpoint of preventing the balls from rolling out of the load rolling groove in the nut member when the screw shaft is pulled out of the nut member, the ball arranging member is preferred to have a function for holding the balls freely rotatably. With such a structure, the balls are held by the ball arranging member and the ball arranging member is guided by the introducing groove of the nut member along an inner peripheral face of the nut member, so that the balls rolling in the load rolling groove are held by the nut member. As a result, even if the screw shaft is pulled out of the nut member, the balls never roll out, so that handling of the nut member is facilitated.

Further, according to the present invention, a plurality of balls do not always have to be disposed in a single ball arranging member, but it is permissible to provide each ball with a ball arranging member and combine these ones in an infinite circulation path such that the balls are arranged in line at a predetermined interval.

On the other hand, although the introducing groove may be formed directly in the inner peripheral face of the nut member by cutting procedure or the like, if considering a process for cutting in the nut member, it is preferable to provide it on the inner peripheral face of the nut member using synthetic resin injection molding or the like. The introducing groove has to be formed spirally with respect to the load rolling groove. Because if this introducing groove is formed by injection molding, a molding die is complicated, it is preferable to fit a substantially cylindrical guide member formed independently of the nut member to an inner circumference of the nut member, so that the introducing groove is formed in the nut member by cooperation between the guide member and the inner circumference of the nut member. That is, a spiral ball escape portion is provided in the guide member corresponding to the load rolling groove of the nut member and the guide portion is formed on each of both sides of the ball escape portion, so that the introducing groove is formed by cooperation between the guide portion and the inner circumference of the nut member. Meanwhile, this guide member may be produced by mechanical process such as cutting or by injection molding of synthetic resin.

When the guide member is fit to the inner circumference of the nut member, the spiral ball escape portion provided in the guide member has to correspond accurately to the spiral load rolling groove formed in the inner circumference of the nut member. Unless they correspond to each other accurately, a ball rolling in the load rolling groove makes a contact with the guide member, thereby hampering smooth circulation of the balls and noise accompanied by the circulation of the balls being generated conceivably. Therefore, from such a viewpoint, it is preferable to form a spiral engaging protrusion in an outer circumference of the guide member along the ball escape portion and further, form an engaging concave groove which the engaging protrusion meshes with in an inner circumference of the nut member along the load rolling groove. With such a structure, the guide member is fixed to the nut member with the engaging protrusion formed in the outer circumference meshing with the engaging groove in the nut member.

Therefore, a relation in position between the load rolling groove of the nut member and ball escape portion of the guide member, further a relation in position between the load rolling groove and introducing groove is made more accurate, so that circulations of the ball and ball arranging member can be made further smooth.

Further, if it is so constructed that the engaging protrusion of the guide member meshes with the engaging concave groove of the nut member, the guide member may be formed spirally like a helical spring, so that the guide member meshes with the nut member, thereby making it possible to make a lead of the guide member agree with that of the load rolling groove. Consequently, the shape of the guide member can be further simplified.

The aforementioned circulation path forming member may be of any type as long as when the circulation path forming member is mounted on the nut member, it connects both ends of the load rolling groove so as to provide the nut member with a ball infinite circulation path, for example, a pipe-like one in which a through hole is made from the outer circumference to the inner circumference so as to connect both ends of the load rolling groove, a pair of end caps which are mounted on both ends of the nut member in an axial direction thereof for transferring/receiving balls to/from a ball return hole which goes through the nut member in the axial direction and the like.

DESCRIPTION OF THE PREFERRED EMBODIMENTS

Hereinafter, a ball screw unit of the present invention will be described in detail with reference to the accompanying drawings.

Figure 1:
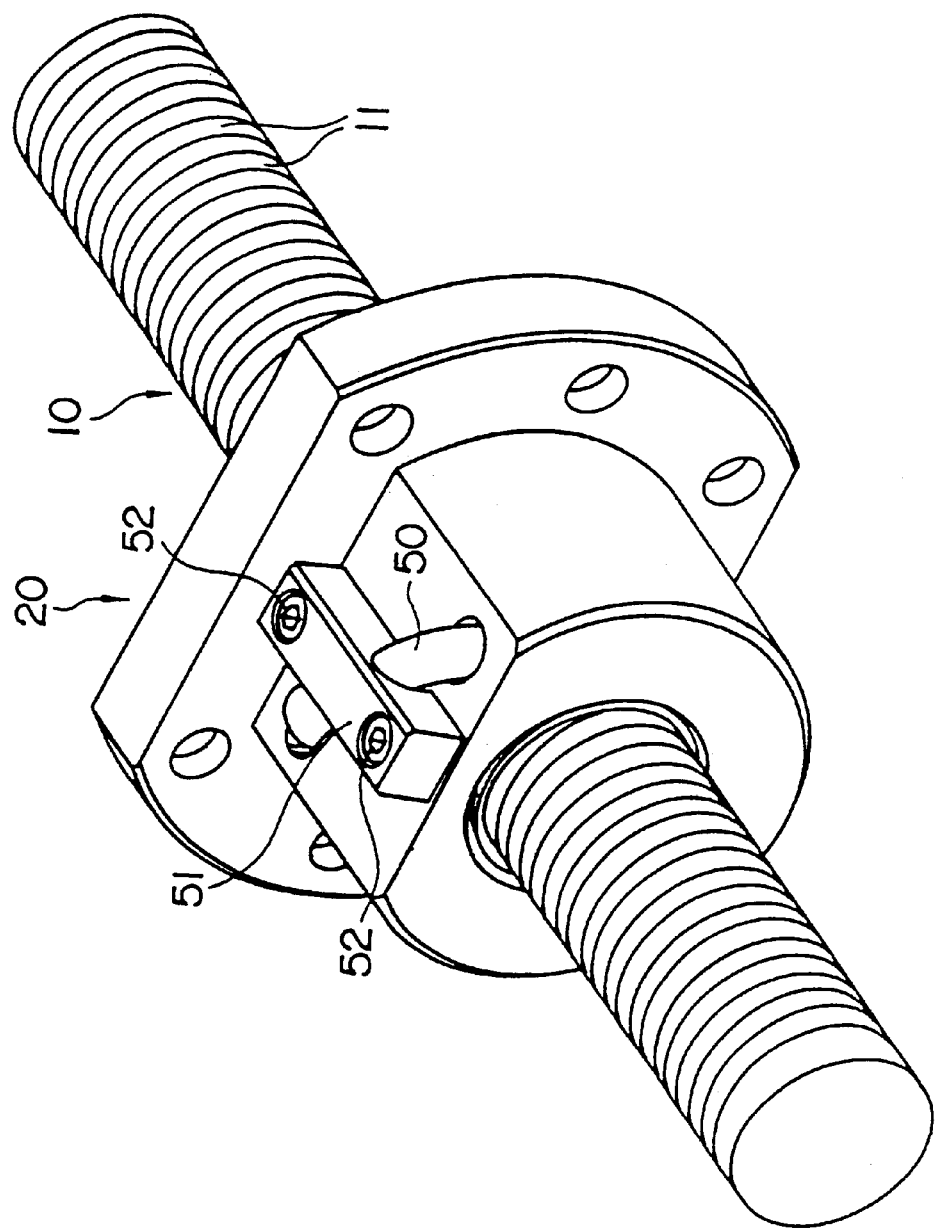
FIG. 1 is a perspective view showing an embodiment of a ball screw unit to which the present invention is applied.
Figure 2:
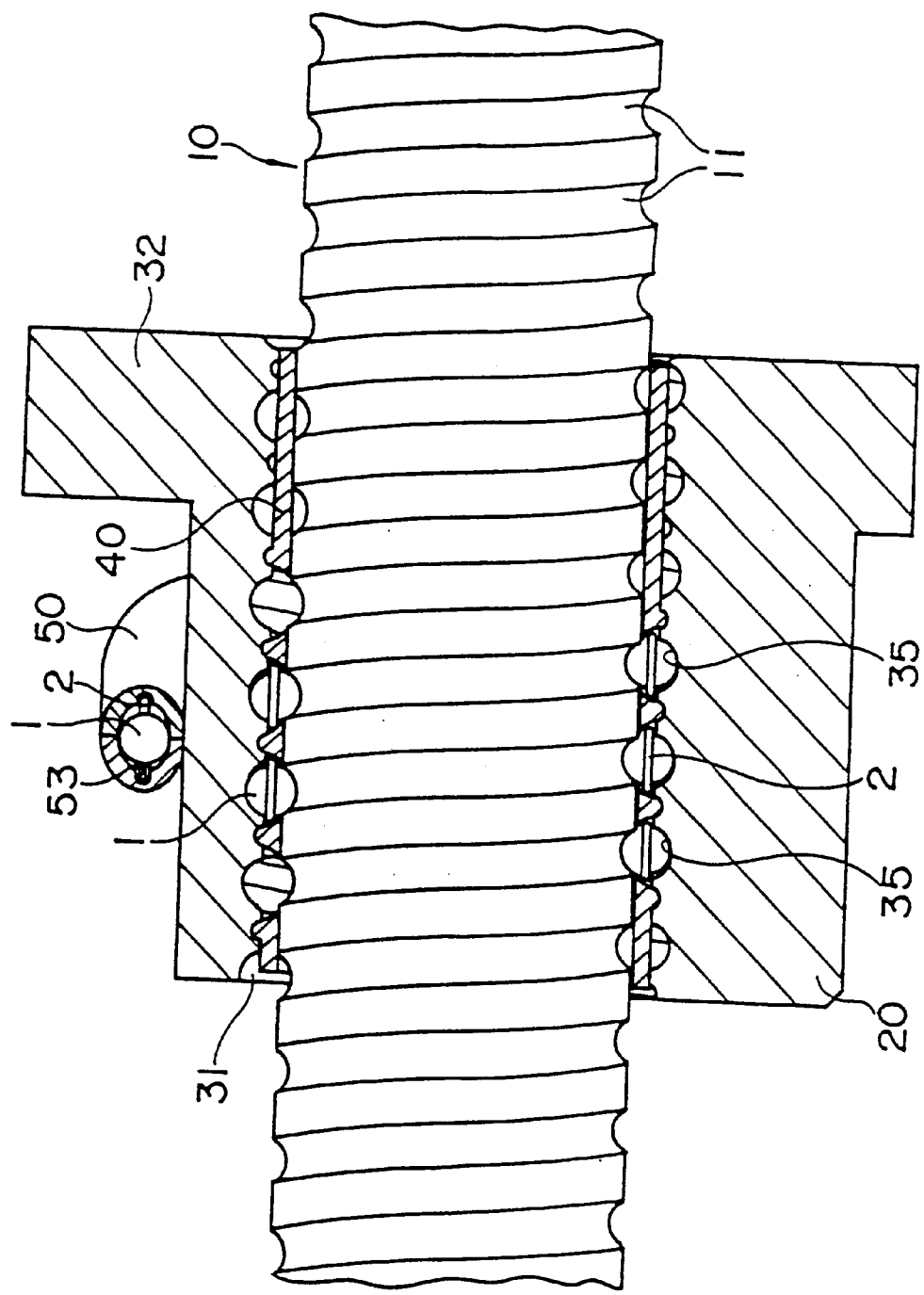
FIG. 2 is a sectional view of the ball screw unit according to the present invention.

FIGS. 1, 2 show an embodiment of the ball screw unit incorporating a ball arranging member. In the same Figure, reference numeral 10 denotes a screw shaft in which a spiral ball rolling grooves 11 are formed at a predetermined lead, reference numeral 20 denotes a steel nut member having an infinite circulation path in which a ball 1 circulates and which meshes with the aforementioned screw shaft 10 via the ball 1, reference number 50 denotes a ball return pipe (circulating path forming member) which is inserted from an outer peripheral face of the nut member 20 to an inner peripheral face thereof so as to form an infinite circulation path for the ball 1, and reference numeral 40 denotes a guide member 40 of synthetic resin which is fit to an inner periphery of the nut member 20. By a relative rotation between the screw shaft 10 and nut member 20, the nut member 20 moves in an axial direction of the screw shaft 10.

Figure 3:
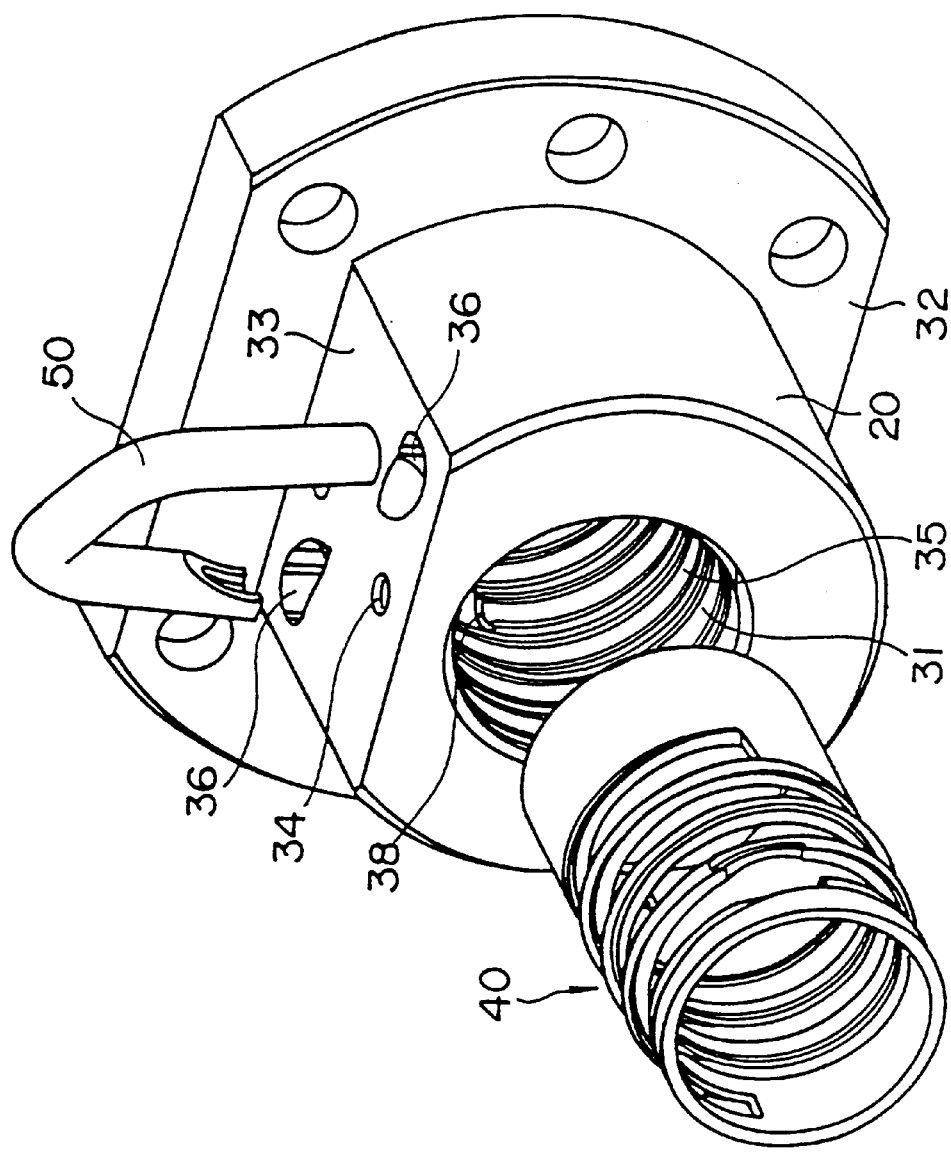
FIG. 3 is a disassembly perspective view of a nut member according to the embodiment.
Figure 4:
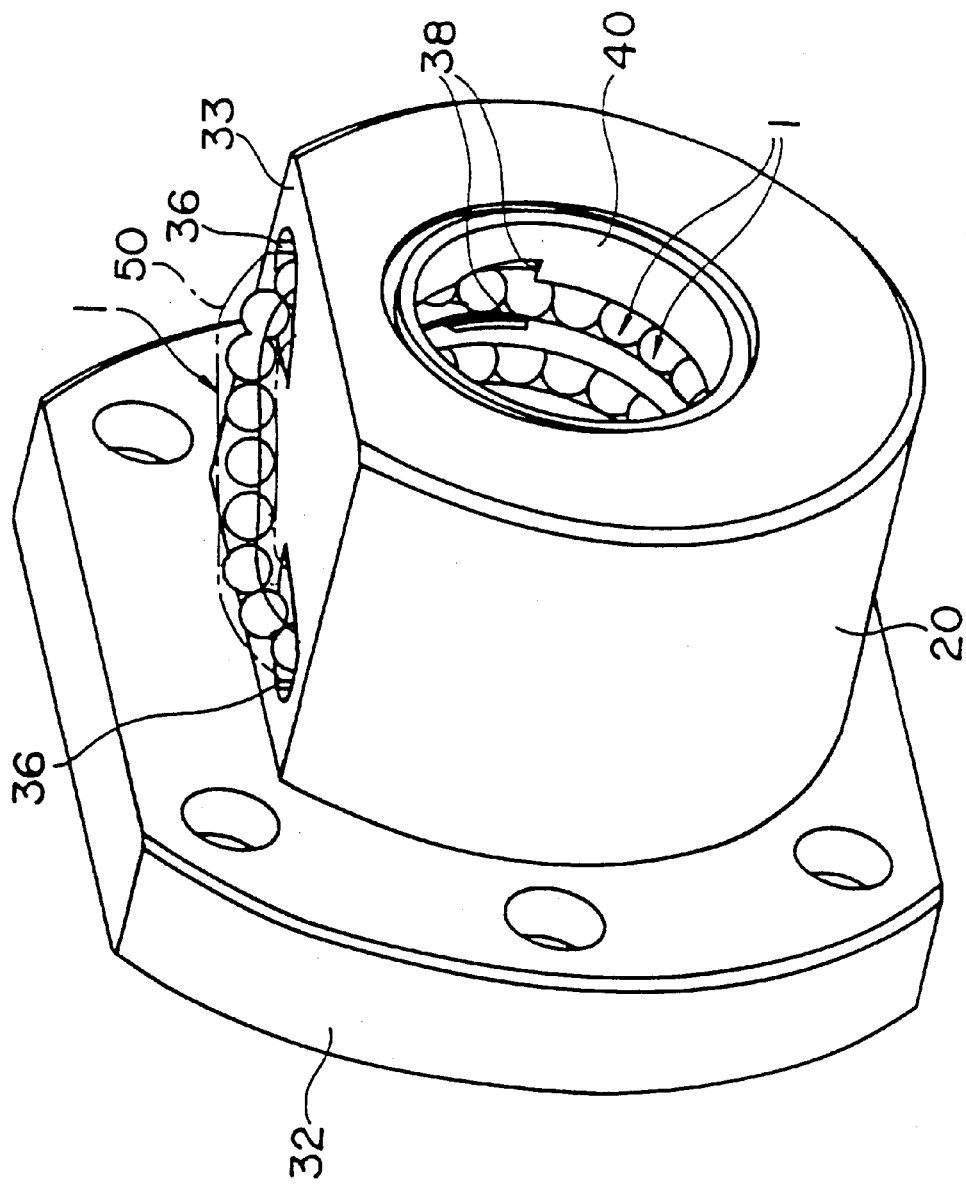
FIG. 4 is a perspective view showing a condition in which balls circulate in an infinite circulation path incorporated in the nut member according to the embodiment.

As shown in FIG. 3, the nut member 20 is formed in a cylindrical shape having a through hole 31 for the screw shaft 10 in the center thereof and a flange 32 for fixing the nut member 20 onto a movable body like a table is provided on an outer peripheral face thereof so as to protrude therefrom. Spiral load rolling grooves opposing the ball rolling groove 11 of the screw shaft 10 are formed on an inner peripheral face of the through hole 31. If a relative rotation occurs between the screw shaft 10 and nut member 20, the ball 1 rolls while bearing the load between the ball rolling groove 11 and load rolling groove 35. A communicating hole 36 which goes through the nut member 20 in the direction of tangent line is provided in the vicinity of both ends of the load rolling groove 35 and both ends of the aforementioned ball return pipe 50 are inserted from outside to inside of the nut member 20 via these communicating holes 36. If the ball 1 rolling through the load rolling groove 35 while bearing the load between the nut member 20 and screw shaft 10 reaches a provision position of the communicating hole 36, the ball 1 is released from the applied load so that it rolls into the ball return pipe 50, and then rolls in the ball return pipe 50 as shown in FIG. 4 and is returned to between the nut member 20 and screw shaft 10 via the other communicating hole 36.

A catching stepped portion 38 is formed at each of both ends of the load rolling groove 35 of the nut member 20 corresponding to the communicating hole 36 such that an end face of the ball return pipe 50 inserted into the nut member 20 via the communicating hole 36 butts against the engaging stepped portion 38 and is caught thereby. Further, a mounting face 33 for fixing the ball return pipe 50 is formed on an outer peripheral face of the nut member 20 such that the ball return pipe 50 is fixed to the nut member 20 with a grip device 51 (see FIG. 1). As shown in FIG. 3, tap holes 34 are formed in the mounting face 33 of the nut member 20 so that fixing bolts 52 inserted through the grip device 51 mesh with each of the tap holes.

Figure 5:
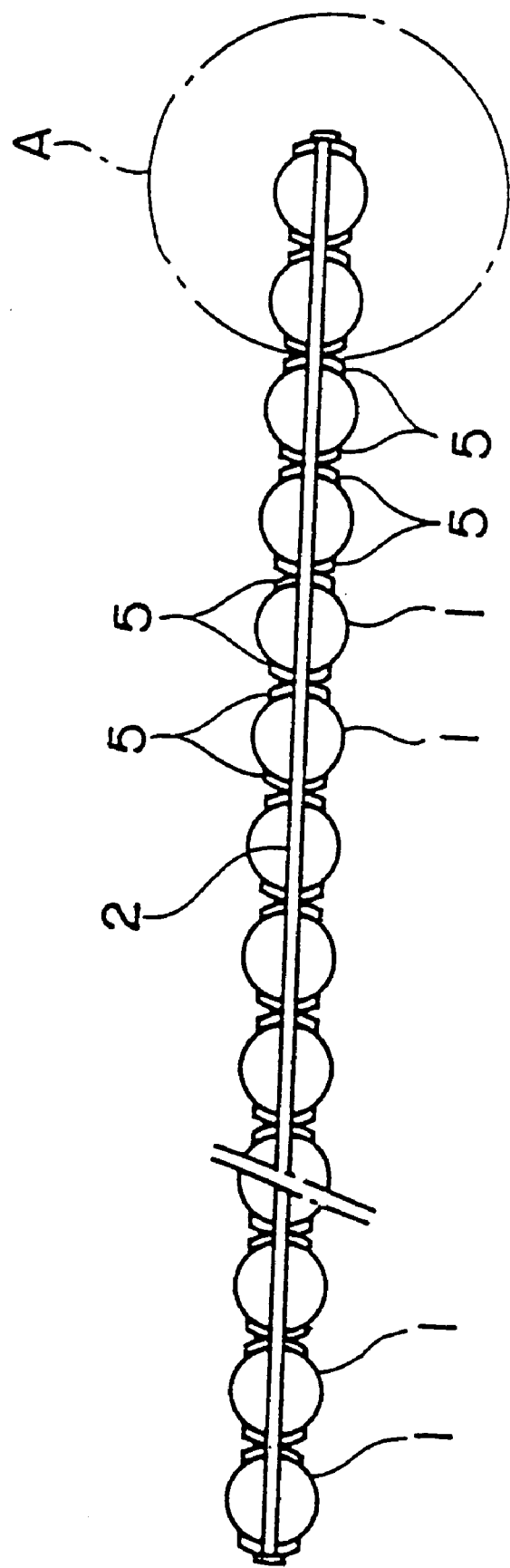
FIG. 5 is a diagram showing a ball arranging member incorporated in a ball screw unit according to the present invention.
Figure 6:
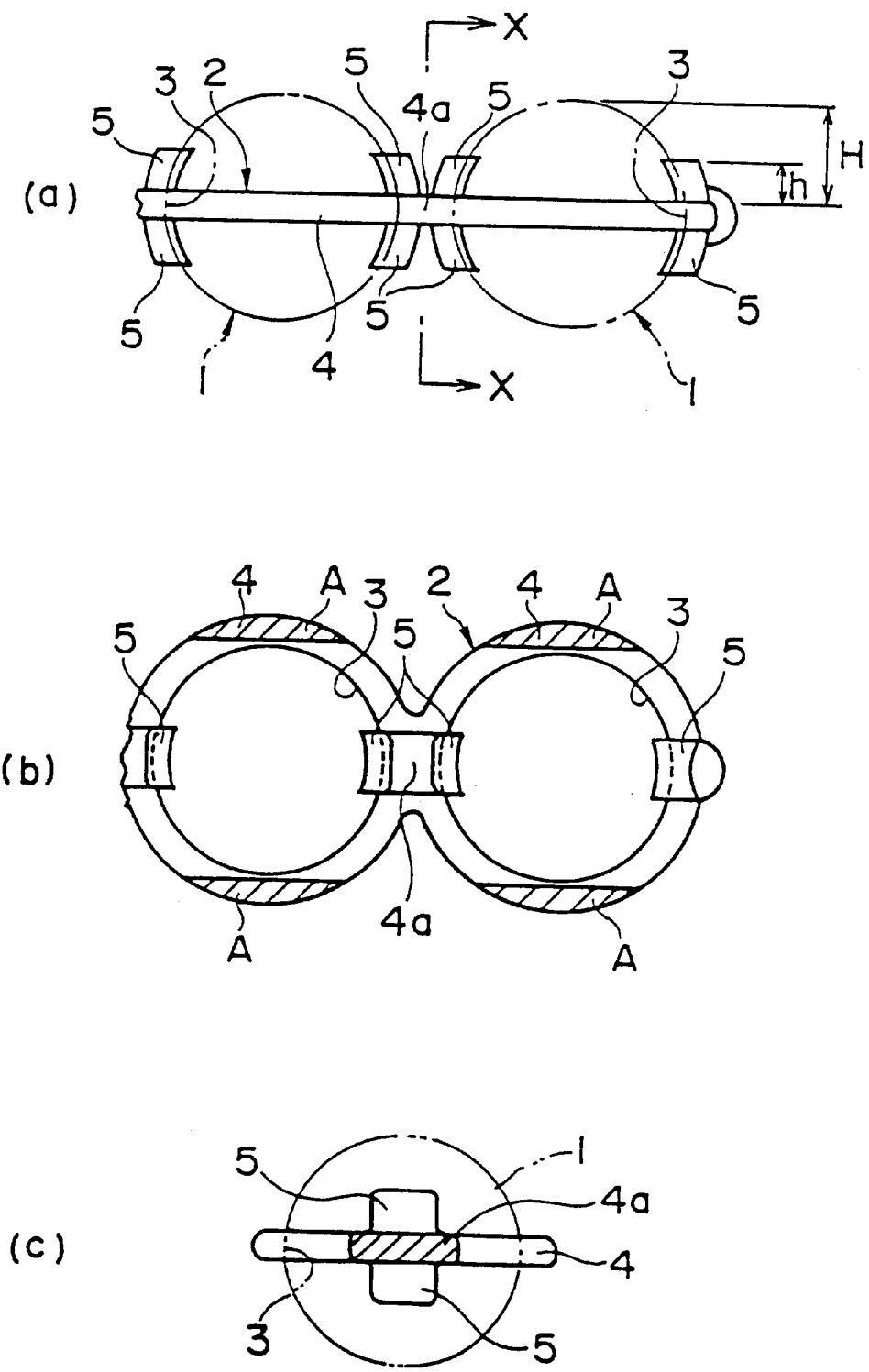
FIG. 6 is a front view, a plan view and a sectional view taken along the line X—X, in which a ball arranging member shown in FIG. 5 is enlarged.

The balls 1 are not contained in the infinite circulation path of the nut member 20 individually but as shown in FIG. 5, they are built in the infinite circulation path in such a condition that they are arranged in line in a ball arranging member 2 of synthetic resin having flexibility. As shown in FIGS. 6 (*a*), (*b*) in enlargement, the ball arranging member 2 is constructed by combining substantially circular connecting units 4 in which an accommodating hole 3 for the ball 1 is formed in line and the respective connecting units 4 are arranged at a predetermined interval in the length direction of the ball arranging member 2 such that a single ball 1 is accommodated in each connecting unit 4. Each connecting unit 4 is connected to other connecting unit 4 adjacent thereto via part of the outer periphery through a connecting portion 4*a*. At a portion between the adjacent connecting units 4, that is, the connecting portion 4*a*, the ball arranging member 2 is in the most tightened shape. Then, because the connecting portion 4*a* is flexible, the ball arranging member 2 is bent or twisted flexibly. FIG. 6(*c*) is a sectional view taken along the line X—X of FIG. 6(*a*).

Further, a pair of escape preventing portions 5, 5 are provided on both front and rear sides in a direction of ball arrangement and on both front and rear faces of each of the connecting units 4. Such an escape preventing portion 5 prevents the ball 1 from escaping from the accommodating hole 3 in each of the connecting units 4. As shown in FIG. 6(*a*), a protrusion height h of the escape preventing portion 5 with respect to the connecting unit 4 is set up to be smaller than the protrusion height H of the ball 1, thereby preventing an interference between the escape preventing portion 5 and the ball rolling groove 11 when the ball 1 rolls in the ball rolling groove 11 of the screw shaft 10.

The ball arranging member 2 is formed by injection molding of synthetic resin with the balls 1 disposed in a molding die as a core and after the molding is finished, the ball arranging member 2 is released from the molding die with the balls 1. If the ball arranging member 2 is injection molded without any treatment, the connecting unit 4 and escape preventing portion 5 come into firm contact with the ball 1, so that the ball 1 does not rotate freely with respect to the ball arranging member 2. Therefore, according to this embodiment, after the molding is completed, the ball arranging member 2 is immersed in mine oil base lubricant with the ball 1 so as to allow the ball arranging member 2 to swell with a passage of time, so that a gap is formed between the ball 1, connecting unit 4 and escape preventing portion 5 thereby making it possible for the ball 1 to rotate freely.

Thus, if the ball 1 circulates in the infinite circulation path provided in the nut member 20 with a relative rotation between the screw shaft 10 and the nut member 20, the ball arranging member 2 also circulates in the infinite circulation path with the ball 1. Because as shown in FIG. 2, a pair of guide grooves 53 are formed in an inner circumference of the ball return pipe 50 along a rolling direction of the ball 1, when the ball arranging member 2 circulates in the ball return pipe 50, part of the connecting unit 4 which is projected to both sides in the arrangement direction of the ball 1 with respect to a diameter of the ball 1 (area A indicated by oblique line of FIG. 6(*b*)) is accommodated in the guide groove 53, so that the ball arranging member 2 moves in the ball return pipe 50 as if it is introduced by the guide groove 53. That is, in this embodiment, the area A of the connecting unit 4 indicated by the oblique line of FIG. 6(*b*) functions as a guide piece of the present invention. As a result, a flutter of the ball arranging member 2 in the ball return pipe 50 is prevented so that smoothness in circulation of the ball 1 held freely rotatably by the ball arranging member 2 is achieved.

Figure 7:
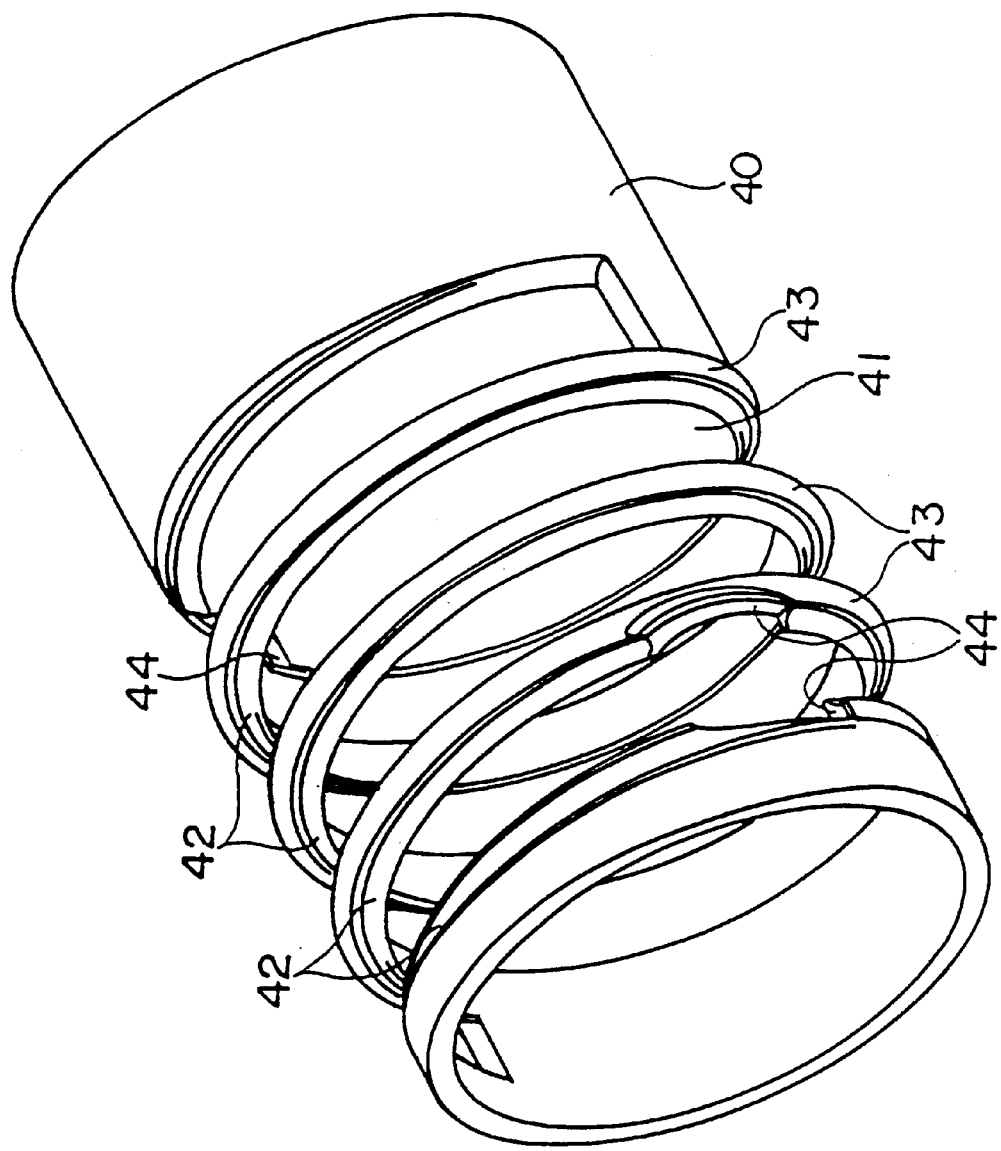
FIG. 7 is a perspective view showing a guide member according to the embodiment.

On the other hand, the guide member 40 which fits to the through hole 31 of the nut member 20 is made of synthetic resin, having a slightly larger inner diameter than an outer diameter of the screw shaft 10 and formed in a substantially cylindrical shape having an outer diameter fitting to the inner diameter of the nut member 20. Therefore, a slight gap is formed between the guide member 40 and screw shaft 10. As shown in FIG. 7, a spiral ball escape portion 41 is provided in the guide member 40 corresponding to the load rolling groove 35 of the nut member 20 so that the ball 1 rolling in the load rolling groove 35 comes into contact with the ball rolling groove 11 of the screw shaft 10 via the ball escape portion 41.

Figure 8:
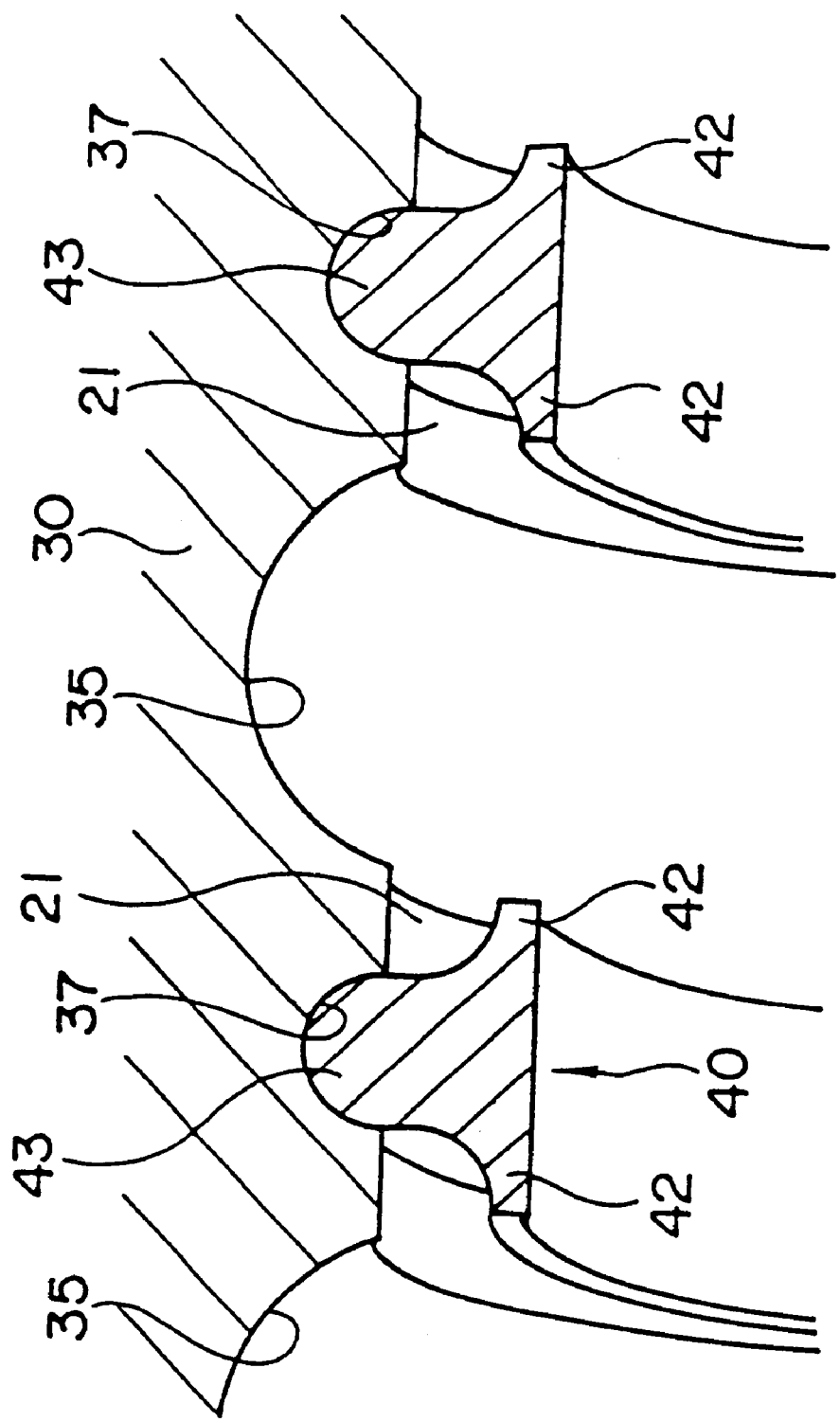
FIG. 8 is an enlarged sectional view showing a fitting condition between the guide member and nut main body according to the embodiment.

A thin guide portion 42 for guiding the ball arranging member 2 along an inner peripheral face of the nut member 20 is formed on both sides of the ball escape portion 41. When the guide member 40 is fit to the nut member 20, as shown in FIG. 8, introducing grooves 21 for accommodating both edge portions of the ball arranging member 2 are formed on both sides of the load rolling groove 35 by cooperation between a retainer guide portion 42 and an inner peripheral face of the nut member 20. To make accurate a relation in position between the ball escape portion 41 of the guide member 40 and the load rolling groove 35 of the nut member 20 and further form the introducing groove 21 accurately along both sides of the load rolling groove 35, a spiral engaging protrusion 43 is formed on an outer peripheral surface of the guide member 40 along the ball escape portion 41 and a spiral engaging concave groove 37 is formed on an inner peripheral surface of the nut member 20 along the load rolling groove 35. By meshing the engaging protrusion 43 with the engaging concave groove 37, the guide member 40 is fit to the through hole 31 of the nut member 20.

Figure 9:
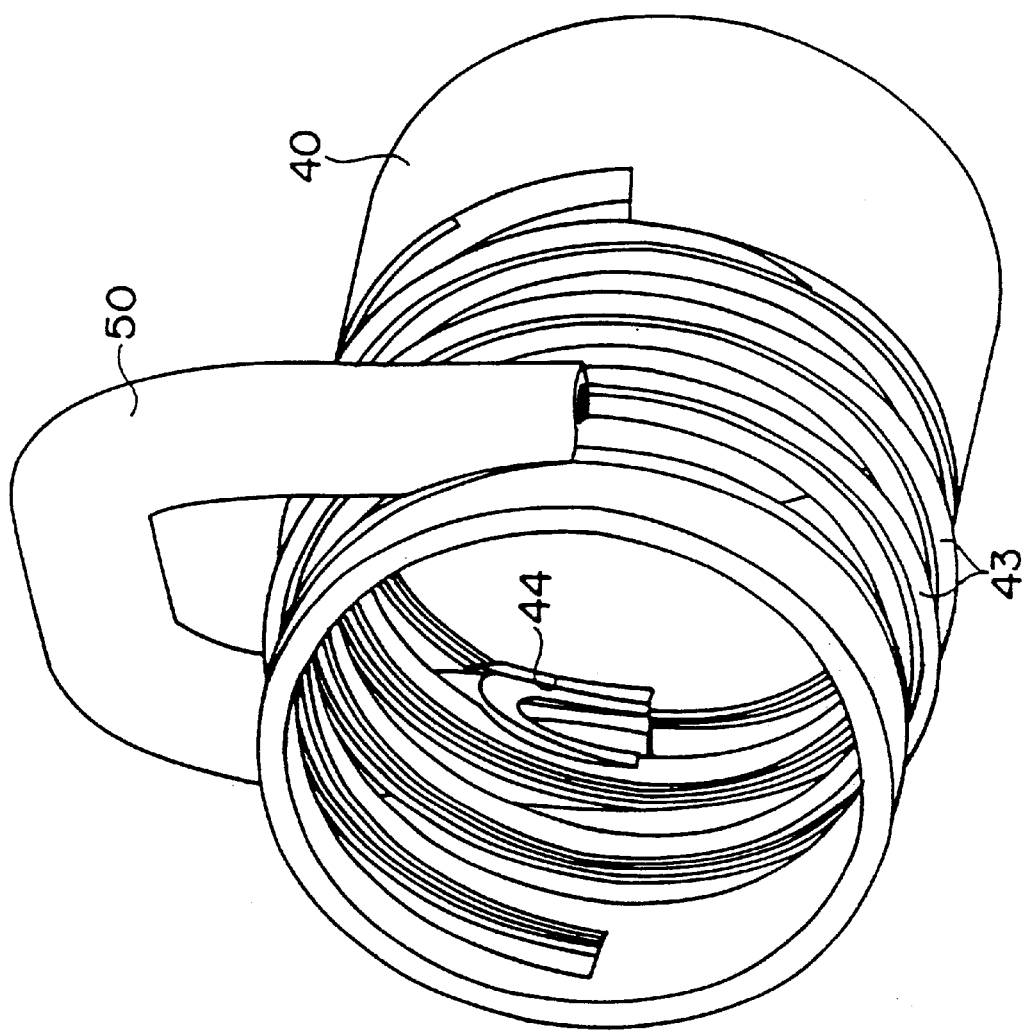
FIG. 9 is a perspective view showing an engaging condition between the guide member and a ball return pipe according to the embodiment.

Further, a cutout portion 44 which is fit to an end of the ball return pipe 50 inserted into the communicating hole 36 of the nut member 20 is formed in the guide member 40. The cutout portion 44 is formed so as to cut out an outer peripheral face of the guide member 40 in the direction of a tangent line, so that the guide portion 42 is interrupted by the cutout portion 44. Therefore, if the ball return pipe 50 is mounted on the nut member 20 with the guide member 40 fit to the through hole 31 of the nut member 20, an end face of the ball return pipe 50 which butts the catching stepped portion 38 of the nut member 20 and is caught thereby also butts the interrupted guide portion 42. FIG. 9 is a perspective view showing a connection between the ball return pipe 50 and the guide member 40. When the ball return pipe 50 is inserted into the communicating hole 36 of the nut member 20 as shown in the same Figure, the front end of the ball return pipe 50 is fit to the cutout portion 44 of the guide member 40 so that a position of the guide member 40 in the circumferential direction is determined by an interference between the end face of the pipe 50 and guide portion 42. Because as described previously, the guide member 40 is fit to the through hole 31 of the nut member 20 by meshing the engaging protrusion 43 of the guide member 40 with the engaging concave groove 37 of the nut member 20, if the position in the circumferential direction of the guide member 40 is determined, a position of the guide member 40 in an axial direction with respect to the nut member 20 is also determined. That is, in this embodiment, by mounting the ball return pipe 50 on the nut member 20, the guide member 40 can be positioned accurately with respect to the nut member 20.

When the ball return pipe 50 is fit to the cutout portion 44 of the guide member 40, the end face of the pipe 50 butts the retainer guide portion 42 of the guide member 40. Thus, the introducing groove 21 formed by cooperation between the retainer guide portion 42 and nut member 20 communicates with the guide groove 53 formed in the inner circumference of the ball return pipe 50. As a result, the ball arranging member 2 which circulates in the infinite circulation path of the nut member 20 with the ball 1 is guided along the inner peripheral face of the nut member 20 by the introducing groove 21 when the ball 1 rolls between the ball rolling groove 11 of the screw shaft 10 and the load rolling groove 35 of the nut member 20, that is, in a load region, and if the ball 1 rolls into the ball return pipe 50 from the load region, that is, the no-load region, it is guided by the guide groove 53 of the ball return pipe 50.

In the ball screw unit of this embodiment having such a structure, if a relative rotation occurs between the screw shaft 10 and nut member 20, the balls 1 disposed in the ball arranging member 2 roll between the load rolling groove 35 of the nut member 20 and the ball rolling groove 11 of the screw shaft 10, and correspondingly, the ball arranging member 2 circulates in the infinite circulation path provided in the nut member 20.

In the ball screw unit of this embodiment, the introducing groove 21 is formed along both sides of the load rolling groove 35 provided in the nut member 20 and both edge portions of the ball arranging member 2 are guided by the introducing groove 21 along the inner peripheral face of the nut member 20. Thus, the ball arranging member 2 which moves in the load region with the ball 1 is not in contact with the screw shaft 10, thereby reducing a resistance applied to the rolling ball 1 and further preventing a wear of the ball arranging member 2.

Because the introducing groove 21 formed along both sides of the load rolling groove 35 of the nut member 20 is continuous with the guide groove 53 of the ball return pipe 50, both the edge portions of the ball arranging member 2 are continuously guided by the introducing groove 21 and guide groove 53 along the entire circumference of the infinite circulation path comprising the load region and no-load region. Consequently, circulation of the ball arranging member 2 and circulation of the balls 1 from the load region to the no-load region or from the no-load region to the load region are made smooth, so that a resistance acting on a relative rotation between the nut member and screw shaft can be reduced correspondingly.

Further, because according to this embodiment, the balls 1 are held rotatably by the ball arranging member 2 and as described above, both the edge portions of the ball arranging member 2 are guided by the introducing groove 21 along the inner circumference of the nut member 20, even if the screw shaft 10 is removed from the nut member 20, the balls 1 rolling in the load rolling groove of the nut member 20 do not escape from the nut member 20, so that handling at the time of assembly of the ball screw unit is facilitated.

Further, because both the edge portions of the ball arranging member 2 are guided by the introducing groove 21 and guide groove 53 along the entire circumference of the infinite circulation path provided in the nut member, plural pieces of the ball arranging members can be built in such an infinite circulation path and made to circulate. As a result, a necessity of producing a very long ball arranging member 2 is eliminated and a procedure for building the ball arranging member 2 in the infinite circulation path is facilitated.

Figure 10:
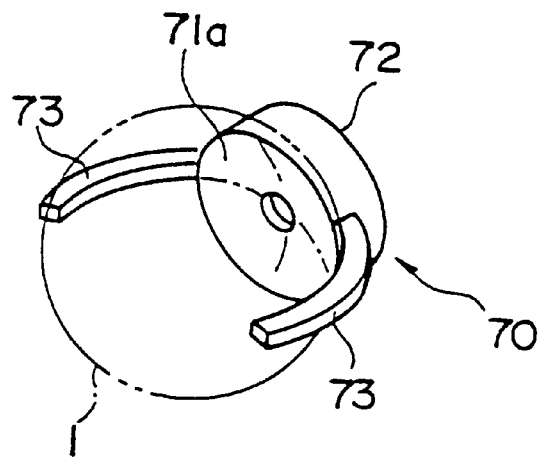
FIG. 10 is a perspective view showing other example of the ball arranging member which can be applied to the ball screw unit according to the embodiment.
Figure 11:
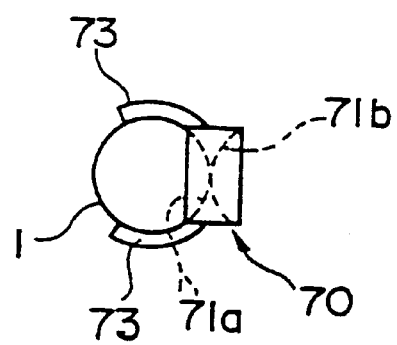
FIG. 11 is a plan view of the ball arranging member shown in FIG. 10.
Figure 12:
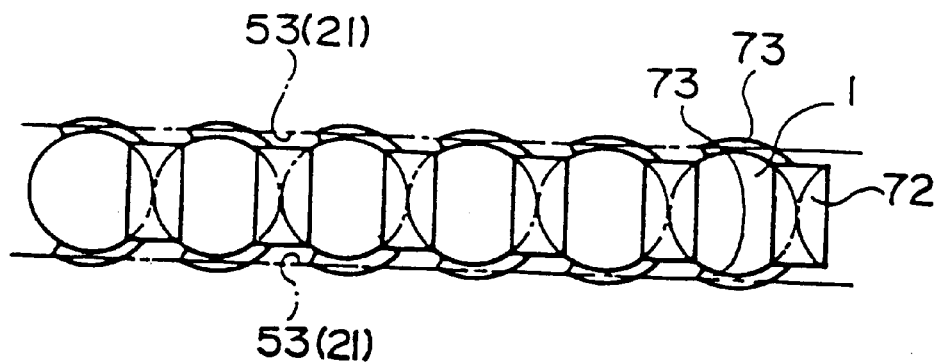
FIG. 12 is a plan view showing a condition in which the ball arranging member shown in FIG. 10 is arranged in the infinite circulation path.

FIGS. 10–12 show other example of a ball arranging member 70 which can be built in the infinite circulation path of the ball screw unit of this embodiment.

The ball arranging member 70 shown in the same Figure is provided individually for each ball and as shown in FIG. 12, they are arranged in the infinite circulation path with the ball 1 for use. Each of the ball arranging members 70 comprises a distance piece 72 having spherical faces 71a, 71b in contact with the ball 1 on front and rear faces thereof and a pair of holding arms 73, 73 erected from the distance piece 72 so as to embrace the ball 1, so that a single ball 1 is held rotatably by the distance piece 72 and holding arms 73.

The ball arranging member 70 having such a structure is disposed in the infinite circulation path such that the distance piece 72 is located between the adjacent balls 1 and 1 and circulates with the ball 1 which rolls. Because in the ball arranging member 70, like the ball arranging member 2 shown in FIG. 6, the holding arm 73 is projected to both sides in the direction of the arrangement of the ball 1 with respect to the diameter of the ball arranging member 70, the holding arms 73 are accommodated in the guide groove 53 of the ball return pipe 50 and introducing groove 21 formed in the nut member 20 as a guide piece of the present invention. Therefore, the ball arranging member 70 can be guided smoothly along a predetermined path in both the load region and no-load region. Consequently, the same effect as when the aforementioned ball arranging member 2 is used can be obtained, that is, a contact between the ball arranging member 70 and screw shaft 10 can be prevented, and smoothness in circulation of the ball 1 in the infinite circulation path is achieved, thereby reducing a resistance applied to a relative rotation between the nut member and screw shaft.

As described above, in the ball screw unit of the present invention, the introducing grooves are formed on both sides of the load rolling groove provided in the nut member and the guide pieces projected to both sides of the ball arranging member are guided by the introducing grooves. Thus, when the ball rolls in the load rolling groove, a phenomenon that the ball arranging member deflects and comes into contact with the screw shaft never occurs. Therefore, circulation of the balls can be carried out smoothly and a motion of the nut member with respect to the screw shaft can be carried out smoothly, and further, a wear of the ball arranging member can be prevented.

Further, because the introducing groove is continuous with the guide groove formed in the ball return pipe, even if the ball arranging member is not formed endlessly but provided individually for each ball, an end portion of the ball arranging member is never caught by an entrance of the circulation forming member. Thus, smoothness in circulation of the ball in the infinite circulation path can be achieved and further, plural ball arranging members can be built in the infinite circulation path for use.

What is claimed is:

1. A ball screw unit comprising a plurality of balls with each ball having a diameter, a screw shaft in which a spiral ball rolling groove is formed on an outer peripheral face thereof, a nut member having a spiral load rolling groove opposing said ball rolling groove of said screw shaft, provided on an inner peripheral face thereof, the nut member meshing with said screw shaft via said balls, and a circulation path forming member for connecting both ends of the load rolling groove of said nut member so as to form an infinite circulation path for the balls, wherein
a ball arranging member which arranges said balls at a predetermined interval and circulates in the infinite circulation path with each ball provided in said infinite circulation path,
a pair of opposing guide pieces extending laterally of each ball,
a pair of guide grooves for accommodating the pair of guide pieces, the pair of guide grooves formed in an inner circumference of said circulation path forming member in a ball rolling direction, and
a pair of introducing grooves which accommodates the pair of guide pieces are continuous with said pair of guide grooves are formed on opposing lateral sides of the load rolling grooves of said nut member.

2. A ball screw unit according to claim 1 wherein said ball arranging member is formed in the shape of a belt in which a plurality of balls are disposed and holds the balls freely rotatably.

3. A ball screw unit according to claim 1 wherein a plurality of the ball arranging members are provided individually for each ball and hold each ball freely rotatably.

4. A ball screw according to any one of claims 1 to 3 wherein a substantially cylindrical guide member is fit to an inner circumference of said nut member, a spiral ball escape portion is provided in said guide member corresponding to a load rolling groove of said nut member and a guide portion for forming said introducing groove together with an inner peripheral face of the nut member is formed on both sides of the ball escape portion.

5. A ball screw unit according to claim 4 wherein a spiral engaging protrusion is formed on an outer peripheral face of said guide member along said ball escape portion while an engaging concave groove meshing with said engaging protrusion is formed in an inner peripheral face of said nut member along the load rolling groove.

6. A ball screw unit according to claim 4 wherein the guide member is positioned with respect to said nut member by mounting said circulation path forming member on the nut member.

7. A ball screw unit, comprising
a plurality of balls with each ball having a diameter;
a screw shaft in which a spiral ball rolling groove formed on an outer peripheral face thereof;
a nut member having a through hole and a spiral load rolling groove opposing said ball rolling groove of said screw shaft and provided on an inner peripheral face thereof, the nut member meshing with said screw shaft via said balls;
a circulation path forming member for connecting both ends of the load rolling groove of said nut member so as to form an infinite circulation path for said balls;
a ball arranging member for arranging said balls at a predetermined interval and for circulating in the infinite circulation path with each ball provided in said infinite circulation path, the ball arranging member including a plurality of substantially circular connecting units with each connecting unit having a pair of opposing guide pieces;
a pair of guide grooves for accommodating the pair of guide pieces formed in an inner circumference of said circulation path forming member in a ball rolling direction, and
a substantially cylindrical guide member sized to be received into the through hole of said nut member and forming a pair of introducing grooves with the nut member which accommodate the pair of guide pieces and are continuous with said pair of guide grooves.

8. A ball screw unit according to claim 7, wherein a spiral ball escape portion is provided in said guide member corresponding to a load rolling groove of said nut member and a guide portion for forming said introducing groove together with an inner peripheral face of the nut member is formed on both sides of the ball escape portion.

9. A ball screw unit according to claim 8 wherein a spiral engaging protrusion is formed on an outer peripheral face of said guide member along said ball escape portion while an engaging concave groove meshing with said engaging protrusion is formed in an inner peripheral face of said nut member along the load rolling groove.

10. A ball screw unit according to claim 8 wherein the guide member is positioned with respect to said nut member by mounting said circulation path forming member on the nut member.

* * * * *